United States Patent
Nakaoka et al.

(10) Patent No.: US 10,247,160 B2
(45) Date of Patent: Apr. 2, 2019

(54) ENGINE STARTING SYSTEM

(71) Applicant: DENSO CORPORATION, Kariya, Aichi-pref. (JP)

(72) Inventors: Takuro Nakaoka, Kariya (JP); Akihiro Imura, Kariya (JP)

(73) Assignee: DENSO CORPORATION, Kariya (JP)

( * ) Notice: Subject to any disclaimer, the term of this patent is extended or adjusted under 35 U.S.C. 154(b) by 99 days.

(21) Appl. No.: 15/447,849

(22) Filed: Mar. 2, 2017

(65) Prior Publication Data
US 2017/0254310 A1    Sep. 7, 2017

(30) Foreign Application Priority Data
Mar. 3, 2016    (JP) .................. 2016-041053

(51) Int. Cl.
| | |
|---|---|
| *F02N 11/08* | (2006.01) |
| *F02D 35/02* | (2006.01) |
| *F02N 11/00* | (2006.01) |
| *F02N 11/10* | (2006.01) |
| *F02N 15/04* | (2006.01) |
| *F02N 11/04* | (2006.01) |

(52) U.S. Cl.
CPC .......... *F02N 11/0833* (2013.01); *F02D 35/02* (2013.01); *F02N 11/006* (2013.01); *F02N 11/0825* (2013.01); *F02N 11/0844* (2013.01); *F02N 11/101* (2013.01); *F02N 15/04* (2013.01); *F02N 11/04* (2013.01); *F02N 2250/04* (2013.01); *F02N 2300/104* (2013.01); *F02N 2300/2011* (2013.01); *Y02T 10/48* (2013.01)

(58) Field of Classification Search
CPC ............ F02N 11/0818; F02N 11/0825; F02N 11/0833; F02N 11/0844; F02N 11/0855; F02N 11/103; F02N 2250/04; F02N 2300/2011; Y02T 10/48
USPC ........................................ 701/113; 123/179.4
See application file for complete search history.

(56) References Cited

U.S. PATENT DOCUMENTS

| | | | |
|---|---|---|---|
| 6,018,199 A | 1/2000 | Shiroyama et al. | |
| 7,949,457 B2 * | 5/2011 | Ishikawa | F02N 3/04 123/631 |
| 2007/0084429 A1 | 4/2007 | Taki et al. | |
| 2007/0137602 A1 * | 6/2007 | Kassner | F02N 11/0844 123/179.25 |
| 2013/0104830 A1 * | 5/2013 | Moriya | F02N 11/00 123/179.4 |
| 2013/0238224 A1 * | 9/2013 | Fujiwara | F02N 11/0844 701/112 |
| 2014/0326208 A1 * | 11/2014 | Shoda | F02N 11/0833 123/179.4 |
| 2014/0345556 A1 * | 11/2014 | Okabe | F02N 11/0844 123/179.16 |
| 2016/0245206 A1 * | 8/2016 | Suzuki | F02N 11/0844 |

* cited by examiner

*Primary Examiner* — Erick R Solis
(74) *Attorney, Agent, or Firm* — Oliff PLC

(57) ABSTRACT

A control device sets reverse rotation period as a cranking prohibition period, and when a start request of an engine is generated during reverse rotation period, cranking is started by driving either or both of the first starter and the second starter when it is detected that a crankshaft is shifted from reverse rotation to forward rotation based on an information of a rotation angle sensor. As a result, the delay from generation of the start request of the engine until cranking is started can be reduced, so that the starting time of the engine can be shortened.

26 Claims, 14 Drawing Sheets

ENGINE STARTING SYSTEM

CROSS-REFERENCE TO RELATED APPLICATION

This application is based on and claims the benefit of priority from earlier Japanese Patent Application No. 2016-41053 filed Mar. 3, 2016, the description of which is incorporated herein by reference.

TECHNICAL FIELD

The present disclosure relates to an engine starting system that starts an engine by using one or both of two starters that generate rotational force.

BACKGROUND

Conventionally, there is known an idling stop system that automatically stops an engine when a vehicle such as an automobile temporarily stops at an intersection or the like.

When an engine speed gradually decreases by an implementation of the idling stop system and immediately before the engine stops, a piston may be pushed back without being able to go over a compression top dead center, which causes a crankshaft to rotate in reverse direction.

If a start request of the engine is generated before the engine completely stops and a starter is operated while the crankshaft is rotating in the reverse direction, an excessive load may be applied to a pinion that meshes with a ring gear of the engine, and thus the pinion may be damaged.

In contrast, a technology that prohibits an act of intentionally rotating a crankshaft (hereafter, this act is called cranking) while reverse rotation of the crankshaft is detected or estimated when a start request is generated in an automatic stop of an engine by an idling stop system has been disclosed in Japanese Patent No. 4228882.

However, in Japanese Patent No, 4228882, until a possibility that reverse rotation does not occur after an engine rotational speed falls below a predetermined rotational speed disappears, in other words, a predetermined time period from when before the crankshaft starts to rotate reversely to when it completely stops rotating, is set as a cranking prohibition period.

Therefore, for example, when the crankshaft repeats reverse rotation and forward rotation, it is impossible to start cranking while the crankshaft is not rotating reversely, that is, while the crankshaft is rotating forward.

As a result, the delay from generation of the start request until the cranking is started increases, causing a problem that the start of the engine is delayed.

SUMMARY

An embodiment provides an engine starting system capable of reducing a delay from a generation of an engine start request to a start of rotating a crankshaft so that a starting time of the engine can be shortened.

An engine starting system in a first aspect includes a starting device for transmitting a rotational force of an engine to a crankshaft to drive the crankshaft, and a control device for controlling an operation of the starting device in response to a start request of the engine.

The engine starting system includes a rotation determination section capable of discriminating a rotation direction of the crankshaft.

When a period where the crankshaft rotates in reverse direction while the engine is stopping is referred to as reverse rotation period, the control device sets reverse rotation period as a cranking prohibition period for prohibiting the starting device from driving the crankshaft, and if the start request is generated during reverse rotation period, the starting device is operated to drive the crankshaft based on an information from the rotation determination section when it is detected that the crankshaft has shifted from reverse rotation to forward rotation.

The engine starting system of the present disclosure only prohibits the crankshaft from being rotated during reverse rotation period.

That is, when the start request is generated during reverse rotation period, the crankshaft can be started rotating by detecting that the crankshaft has shifted from reverse rotation to forward rotation.

Thus, there is no need to wait to start rotating the crankshaft until the rotation of the crankshaft is completely stopped, and the crankshaft can be started rotating when it is detected that the crankshaft shifts from reverse rotation to forward rotation, so that the delay from generation of the engine start request to a start of rotating the crankshaft can be reduced.

DETAILED DESCRIPTION OF THE PREFERRED EMBODIMENTS

Aspects for carrying out the present disclosure will be described in detail by the following embodiments.

EMBODIMENTS

First Embodiment

Figure 1:
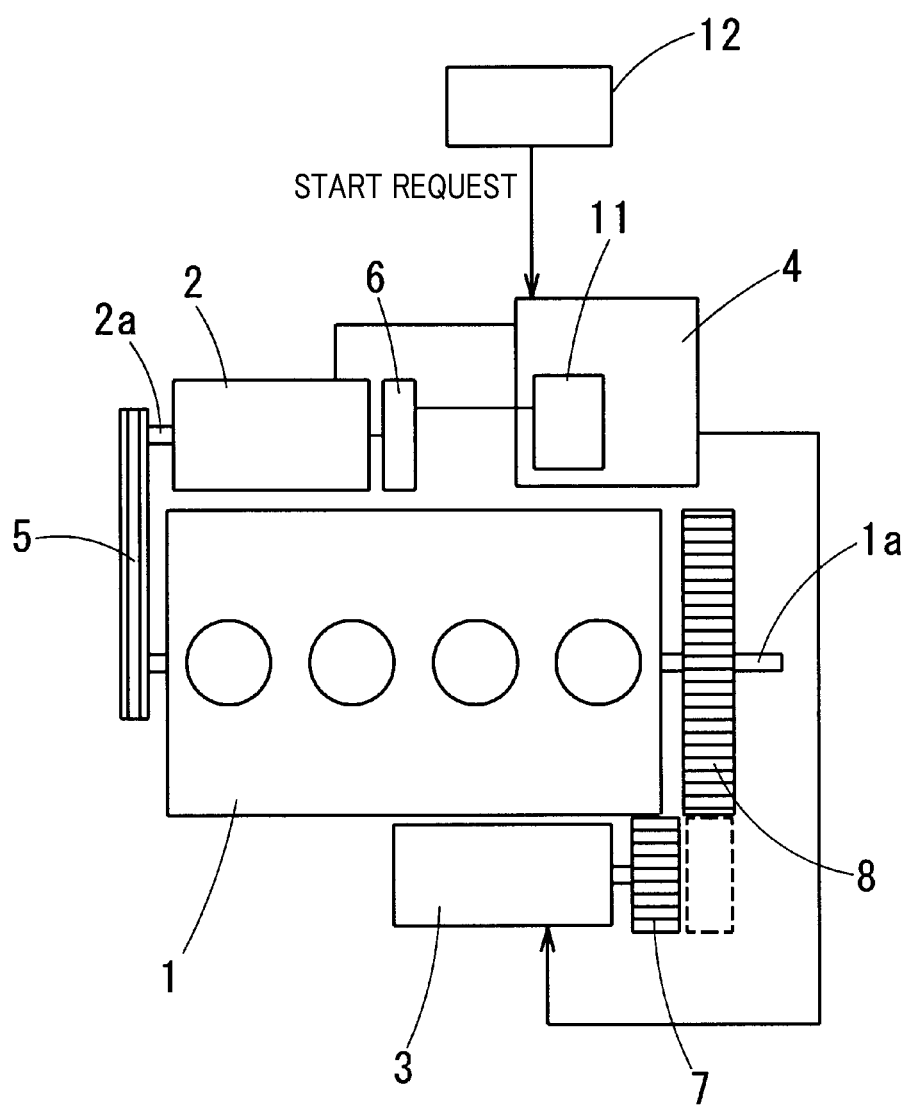
FIG. 1 shows a configuration diagram of an engine starting system according to a first embodiment.

As shown in FIG. 1, an engine starting system of a first embodiment includes a first starter 2, which is a starting device, constantly connected to a crankshaft 1a of an engine 1, a second starter 3, which is another starting device, connectable to the crankshaft 1a, and a control device 4 for controlling operations of the first starter 2 and the second starter 3.

The first starter 2 is, for example, a motor generator that functions as an electric motor and a generator, and a rotor shaft 2a thereof is connected to the crankshaft 1a via a belt 5.

In addition, the first starter 2 may be an alternator that varies a rotational speed according to a power source frequency.

The first starter 2 is provided with a rotation angle sensor 6, which is a rotation angle detection section capable of detecting a rotation angle of a rotor.

The rotation angle sensor 6 can use, for example, a resolver capable of detecting the rotation angle and a rotation direction of the rotor by voltage signals outputted from two detection coils.

The second starter 3 is, for example, a pinion-plunging type starter that pushes a pinion 7 in an axial direction and meshes it with a ring gear 8 of the engine 1.

The second starter 3 is constituted by including a motor for driving the pinion 7, and an electromagnetic switch for energizing the motor and pushing the pinion 7.

The electromagnetic switch incorporates a solenoid which generates an electromagnetic force by energization, and has a function of pushing the pinion 7 by utilizing the electromagnetic force generated by the solenoid and a function of opening and closing a main contact provided in a motor circuit so that a current flowing through the motor is turned on and off.

The ring gear 8 is provided on an outer periphery of a drive plate of an AT (automatic transmission) vehicle or a flywheel of an MT (manual transmission) vehicle attached to the crankshaft 1a, and rotates together with the crankshaft 1a.

Figure 2:
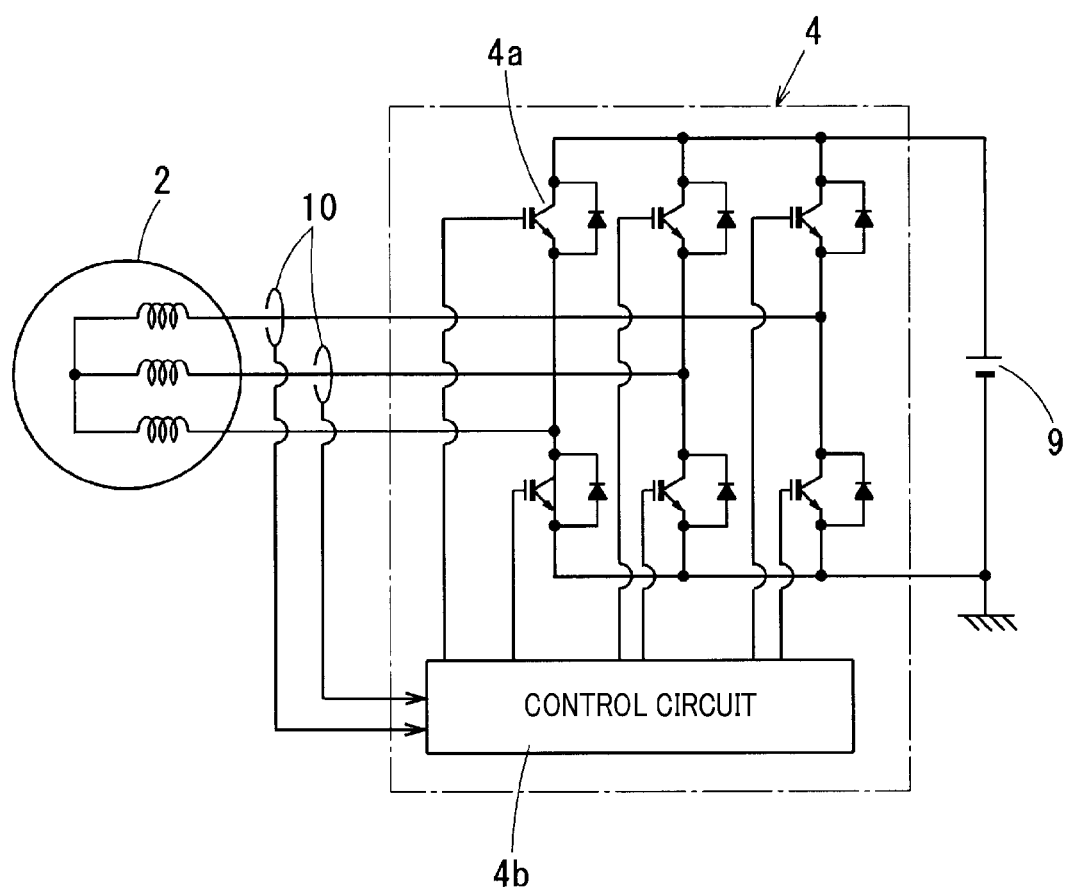
FIG. 2 shows a configuration diagram of a control device (inverter) according to the first embodiment.

As shown in FIG. 2, the control device 4 is an inverter capable of converting a direct current to an alternating current, and includes a plurality of switching elements 4a connected to a battery 9, and a control circuit 4b for controlling on and off operations of the switching elements 4a by feeding back a current flowing from a current sensor 10 to the first starter 2.

The control device 4 manages drive timings of the first starter 2 and the second starter 3, and is capable of arbitrarily controlling a rotation speed of the first starter 2 by adjusting the voltage and frequency applied to the first starter 2.

Note that the drive timing refers to a timing at which the first starter 2 and the second starter 3 start operating by outputting drive commands to the first starter 2 and the second starter 3.

Further, the control device 4 has a function (hereinafter referred to as a rotation determination section 11) that inputs a detection signal of the rotation angle sensor 6 and discriminates a direction of a rotation of the first starter 2, that is, a rotation direction of the crankshaft 1a.

Hereinafter, a procedure for executing a cranking (a cranking means to intentionally rotate a crankshaft for staring the engine) in response to a start request of the engine 1 will be described with reference to a flowchart shown in FIG. 3.

Figure 3:
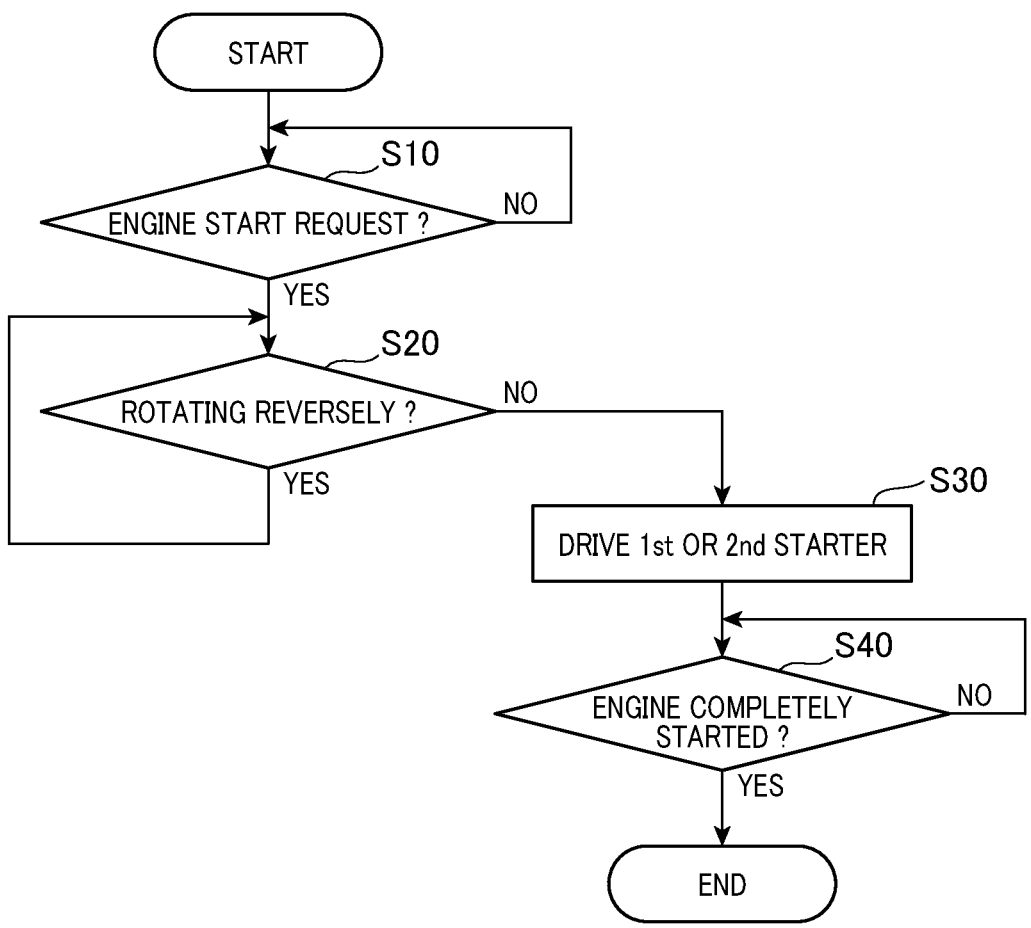
FIG. 3 shows a flowchart of a control procedure of the first embodiment.

The following steps S10 to S40 correspond to S10 to S40 denoted to each step of the flowchart shown in FIG. 3.

Step S10: It is determined whether or not the start request of the engine 1 is inputted after an idling stop system is implemented.

Step S10 is repeated until the start request is inputted, and after the start request is inputted, the process proceeds to step S20.

The start request of the engine 1 is outputted from an engine ECU 12 (refer to FIG. 1), for example, when an operation such as loosening a brake pedal by a driver, changing a shift lever from an N range to a D range, or the like is performed.

The engine ECU 12 is an electronic control device that controls an operation state of the engine 1.

Step S20: It is determined whether or not the crankshaft 1a is rotating in reverse direction.

Reverse rotation of the crankshaft 1a is determined by the rotation determination section 11 based on the information from the rotation angle sensor 6.

While the crankshaft 1a is rotating in the reverse direction, step S20 is repeated, and when reverse rotation is not detected, the process proceeds to the next step S30.

Step S 30: The drive command to either one of the first starter 2 and the second starter 3 is outputted.

A condition for selecting either one of the first starter 2 and the second starter 3 is, for example, a temperature, and as a specific example, the second starter 3 is selected in a case of an extremely low temperature, and the first starter 2 is selected in a case of a room temperature to a high temperature.

After a rotational force generated in the first starter 2 or the second starter 3 is transmitted to the crankshaft 1a and cranking is started, the process proceeds to the next step S40.

Step S40: It is determined whether or not the engine 1 has been completely started.

The step S40 is repeated until the engine 1 is completely started, and after it is determined that the engine 1 has been completely started, the present process ends.

Completion of start of the engine 1 can be determined, for example, based on a preset complete combustion speed.

In other words, when the engine speed exceeds the complete combustion speed, it can be determined that the engine 1 has been completely started.

Operations and Effects of First Embodiment

The engine starting system of the first embodiment does not proceed to step S30 while the crankshaft 1a is rotating in the reverse direction.

That is, a period during which the crankshaft 1a is rotating in the reverse direction is set as a cranking prohibition period.

Figure 4:
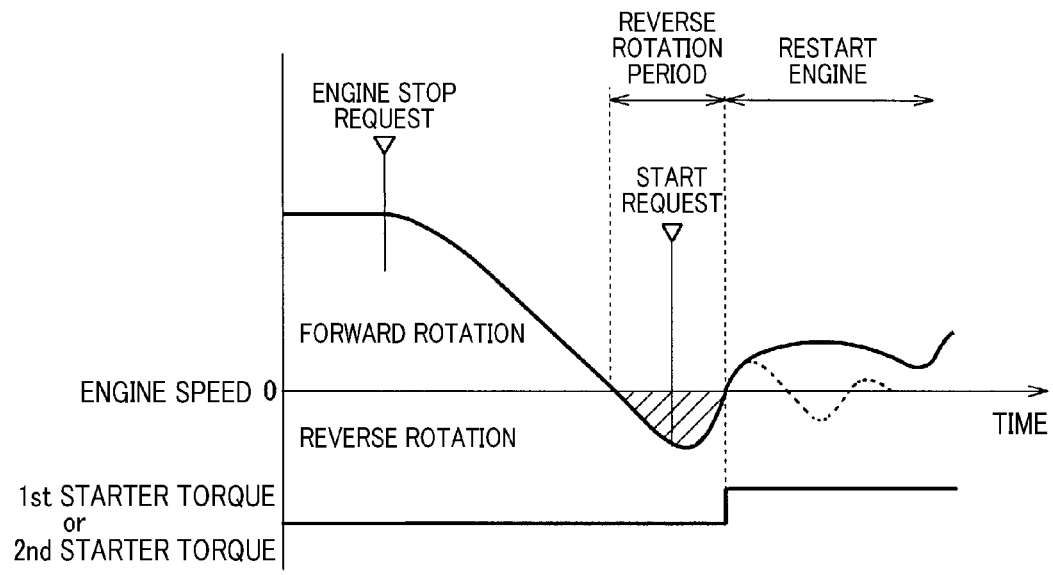
FIG. 4 shows a time chart according to the control of the first embodiment.

As shown in FIG. 4, when the idling stop system is implemented in response to the stop request of the engine 1, the crankshaft 1a may be rotated in the reverse direction before the engine speed gradually decreases and the engine completely stops.

While the crankshaft 1a is rotating in the reverse direction, the cranking does not start immediately even if the start request of the engine 1 has been generated, and when it is detected that the crankshaft 1a has shifted from reverse rotation to forward rotation, the cranking will be started by driving either one of the first starter 2 and the second starter 3.

It should be noted that "when it is detected that the crankshaft 1a has shifted from reverse rotation to forward rotation" is the time when the determination result of step S20 changes from YES to NO.

Figure 5:
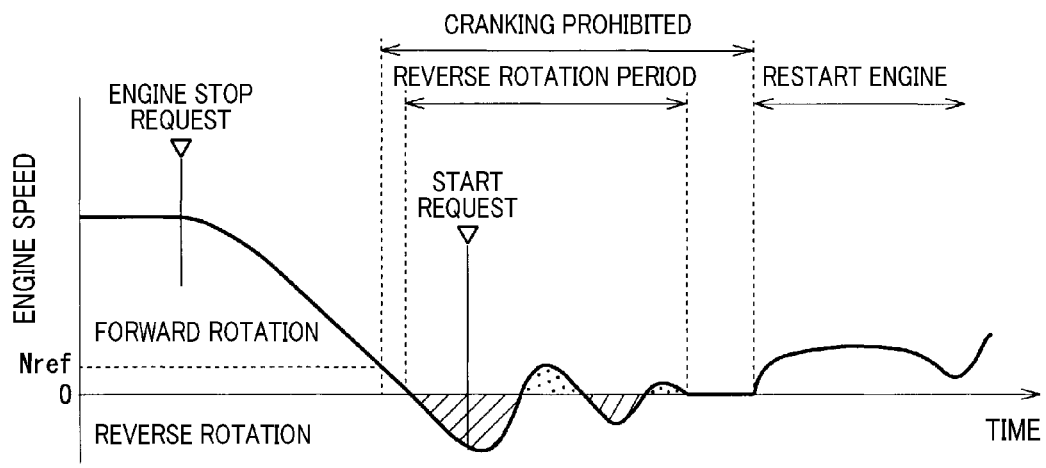
FIG. 5 shows a time chart according to a control of a conventional technology.

In the prior art disclosed in the above-mentioned Japanese Patent No. 4228882, a period from before the crankshaft 1a starts rotating in the reverse direction until the crankshaft completely stops rotating is set as a cranking prohibition period, as shown in FIG. 5.

That is, the cranking prohibition period is set to be longer than reverse rotation period in which the crankshaft 1a repeats reverse rotation and forward rotation.

Therefore, the cranking cannot be started until the cranking prohibition period ends even if the start request generates during the crankshaft 1a is repeating the reverse and forward rotations.

As a result, since the delay from the generation of the start request until the cranking is started increases, so that the starting time of the engine 1 becomes long.

On the other hand, in the engine starting system according to the first embodiment, it is not necessary to wait until the rotation of the crankshaft 1a is completely stopped when the start request is generated during reverse rotation period, and the cranking can be started when it is detected that reverse rotation has shifted to forward rotation.

As a result, compared with the prior art, the delay from the generation of the start request until the cranking is started can be reduced, so that the starting time of the engine 1 can be shortened.

In addition, when the start request is generated during reverse rotation period, the cranking is started when it is detected that reverse rotation period in which the start request generates is ended and the engine has been shifted to forward rotation.

In other words, there is no need to wait until the second and subsequent reverse rotation periods have ended when the start request is generated during the first reverse rotation period, and since the cranking can be started when it is detected that the first reverse rotation period has ended and has been shifted to forward rotation, the engine 1 can be restarted at an early stage.

Further, although a crank angle sensor for detecting the rotation angle of the crankshaft 1a is used in the engine control, reverse rotation and extremely low speed of the crankshaft 1a cannot be detected in a general-purpose MPU type crank angle sensor using a pickup coil.

In order to detect reverse rotation and extremely low speed of the crankshaft 1a, the sensor is necessary to be changed to an expensive MRE type sensor using a magneto-resistive element.

On the other hand, in the engine starting system of the first embodiment, since reverse rotation of the crankshaft 1a at an extremely low speed can be detected based on the information from the rotation angle sensor 6 (resolver) of the first starter 2, it is not necessary to use an expensive MRE type sensor for the engine control.

Hereinafter, other embodiments of the present disclosure will be described.

It should be appreciated that, in the second embodiment and the subsequent embodiments, components identical with or similar to those in the first embodiment are given the same reference numerals, and repeated structures and features thereof will not be described in order to avoid redundant explanation (refer to the first embodiment).

Second Embodiment

In the second embodiment, the cranking is performed using both the first starter 2 and the second starter 3.

Figure 6:
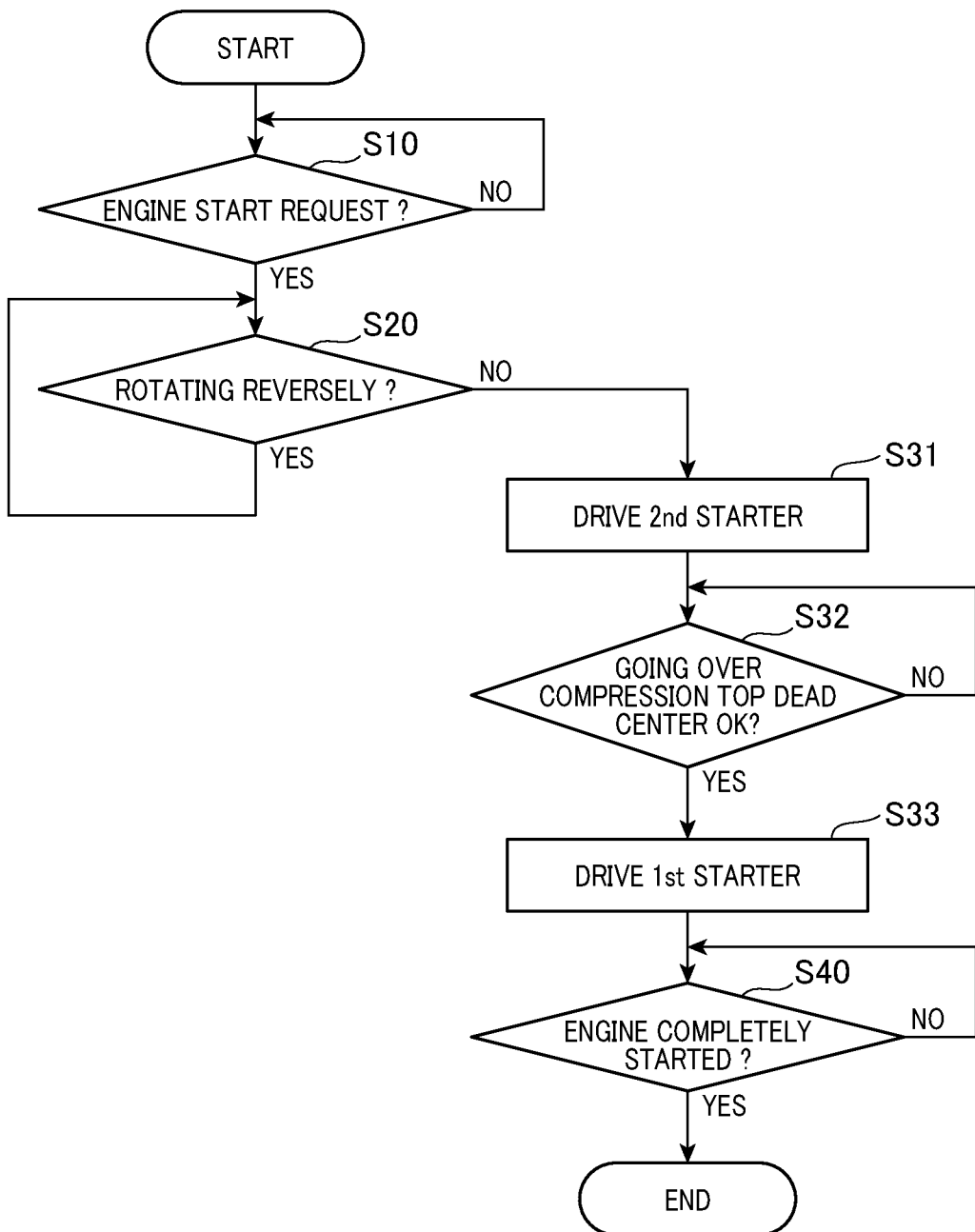
FIG. 6 shows a flowchart of a control procedure of a second embodiment.

Hereinafter, a procedure for executing the cranking in response to the start request of the engine 1 will be described with reference to a flowchart shown in FIG. 6.

Note that steps S10, S20, and S40 are the same as those in the first embodiment, and steps S31, S32, and S33 are executed in place of step S30 of the first embodiment.

Step S31: The second starter 3 is driven prior to the first starter 2.

In the second starter 3, the solenoid of the electromagnetic switch is energized by the drive command outputted from the control device 4.

As a result, the pinion 7 pushed out by the electromagnetic force meshes with the ring gear 8, and the torque of the motor is transmitted from the pinion 7 to the ring gear 8 to drive the crankshaft 1a.

Step S32: It is determined whether or not a piston of the engine 1 has gone over a top dead center of a first compression stroke (hereinafter referred to as a compression top dead center).

Whether or not the piston has gone over the compression top dead center is determined based on at least one piece of information among the rotation speed, torque, and current of the first starter 2 constantly connected to the crankshaft 1a via the belt 5.

Step S32 is repeated until can be determined that the piston has gone over the compression top dead center, and after determining that the piston has gone over it, the process proceeds to step S33.

Step S33: Switching from the second starter 3 to the first starter 2 to drive the crankshaft 1a.

That is, when it is determined that the piston has gone over the compression top dead center, the drive command to the second starter 3 is stopped and a drive command is outputted to the first starter 2.

Figure 7:
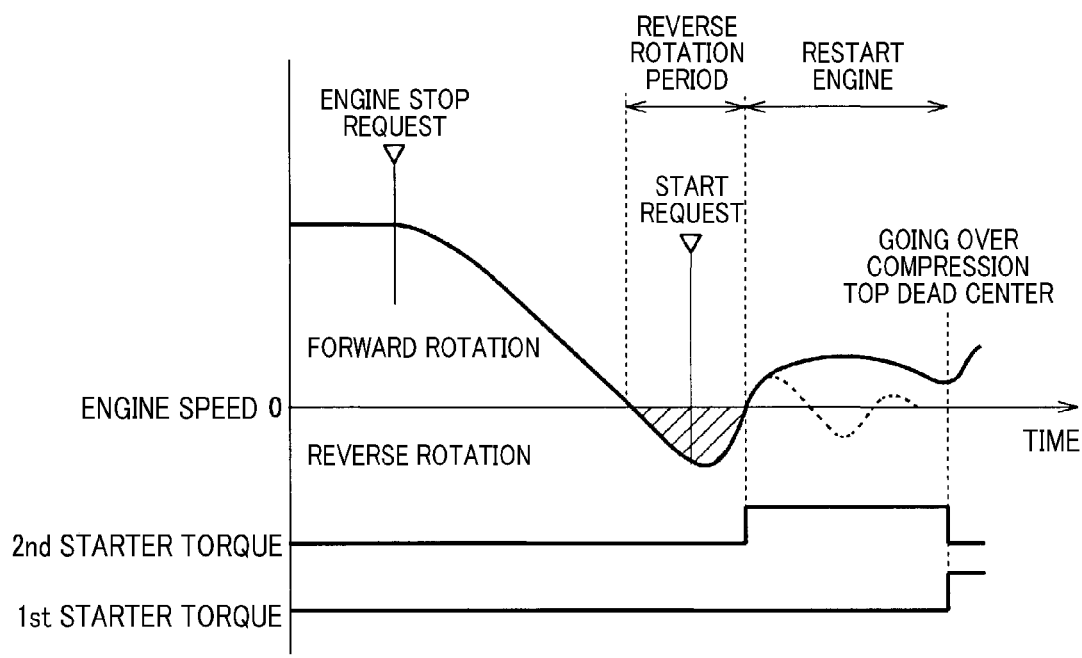
FIG. 7 shows a time chart according to the control of the second embodiment.

As a result, as shown in the time chart of FIG. 7, torque is transmitted from the second starter 3 to the crankshaft 1a until the piston goes over the compression top dead center, thereby driving the crankshaft 1a.

In addition, after the piston goes over the compression top dead center, torque is then transmitted from the first starter 2 to the crankshaft 1a to drive the crankshaft 1a.

In the second embodiment, when it is detected that the crankshaft 1a shifts from reverse rotation to forward rotation, the second starter 3 drives the crankshaft 1a, and since after the piston goes over the compression top dead center, the first starter 2 is driven, and thereby the size of the first starter 2 can be reduced.

That is, since a design torque of the first starter 2 can be made smaller than a torque required for the piston to go over the compression top dead center (also referred to as going-over torque), the first starter 2 can be miniaturized accordingly.

Further, the speed reduction ratio of the second starter 3 connected to the crankshaft 1a by engaging the pinion 7 with the ring gear 8 can be increased with respect to the first starter 2 connected to the crankshaft 1a by the belt 5.

That is, the torque transmitted from the second starter 3 to the crankshaft 1a is larger than the torque transmitted from the first starter 2 to the crankshaft 1a, and the second starter 3 is started before the first starter 2 is started so that the starting time of the engine 1 can be shortened.

Further, since the first starter 2 is connected to the crankshaft 1a via the belt 5, the engine can be started quietly after the piston goes over the compression top dead center.

Further, since the second starter 3 is driven after the crankshaft 1a shifts from reverse rotation to forward rotation, that is, the second starter 3 is not driven during reverse rotation of the crankshaft 1a, an excessive load is not applied to the pinion 7, and damage to the pinion 7 can be avoided.

Third Embodiment

In the third embodiment, reverse rotation of the crankshaft 1a is suppressed from being generated by the first starter 2.

Figure 8:
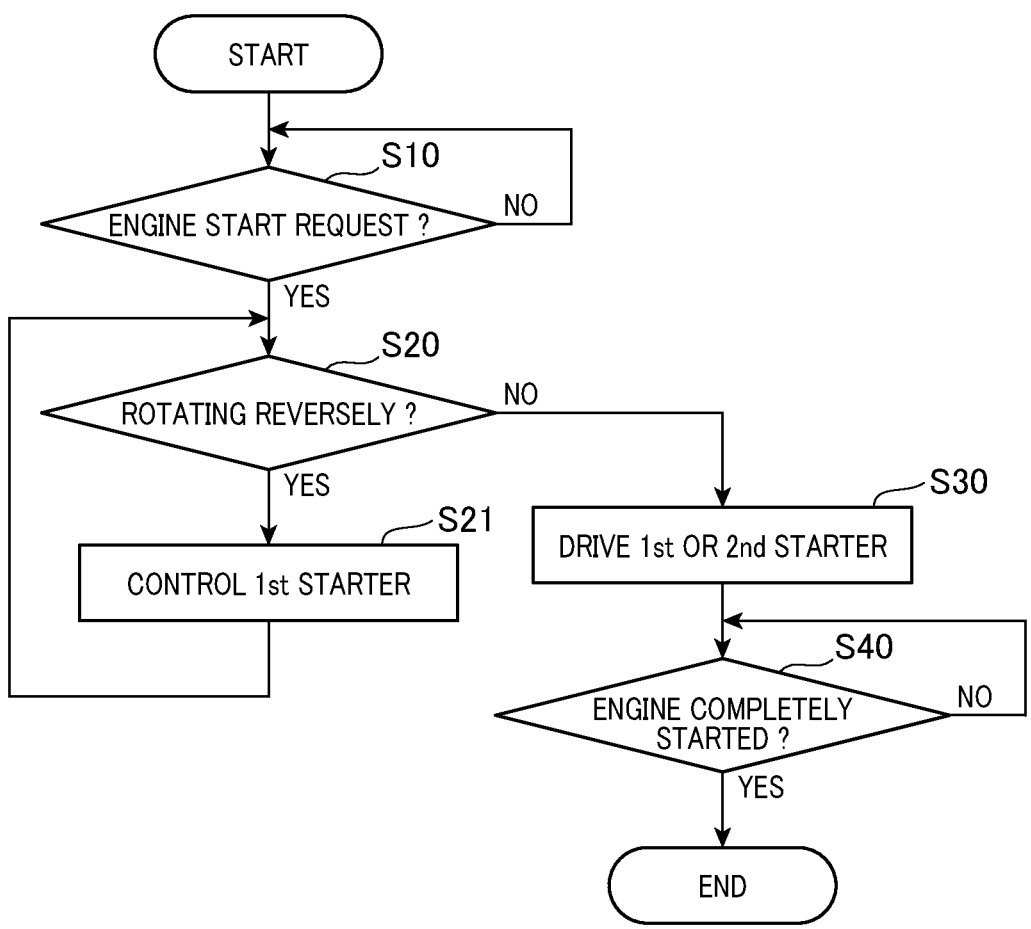
FIG. 8 shows a flowchart of a control procedure of a third embodiment.
Figure 9:
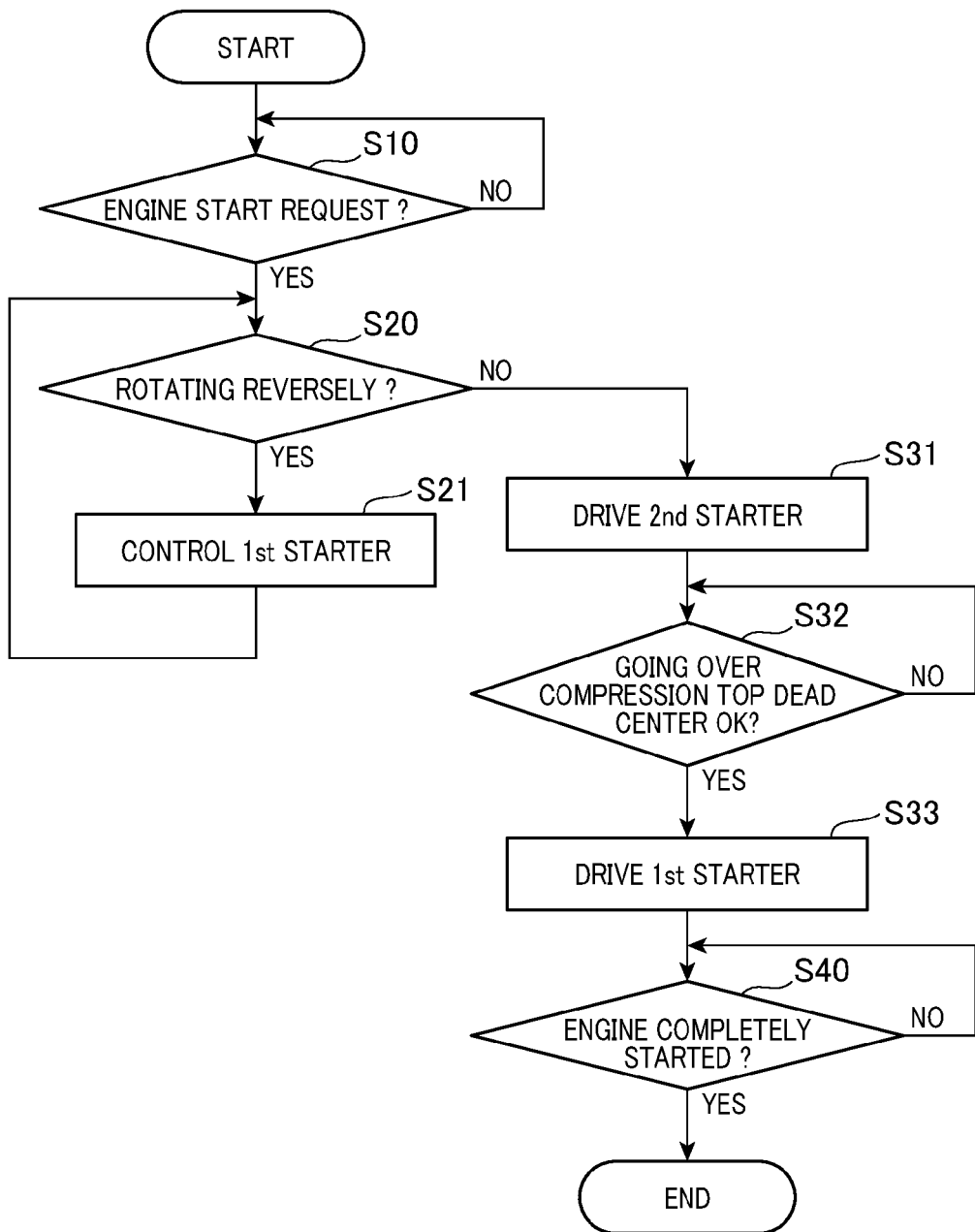
FIG. 9 shows another flowchart of a control procedure of the third embodiment.

As shown in the flowchart of FIG. 8 or FIG. 9, when the determination result of step S20 is YES, step S21 is executed.

The flowchart of FIG. 8 shows a procedure in a case of performing the cranking by driving either one of the first starter 2 and the second starter 3 similarly to the first embodiment.

The flowchart of FIG. 9 shows a procedure in a case where cranking is performed by using the first starter 2 and the second starter 3 in the same manner similarly to the second embodiment.

Step S21: The operation of the first starter 2 is controlled to suppress reverse rotation of the crankshaft 1a from being generated.

Figure 10:
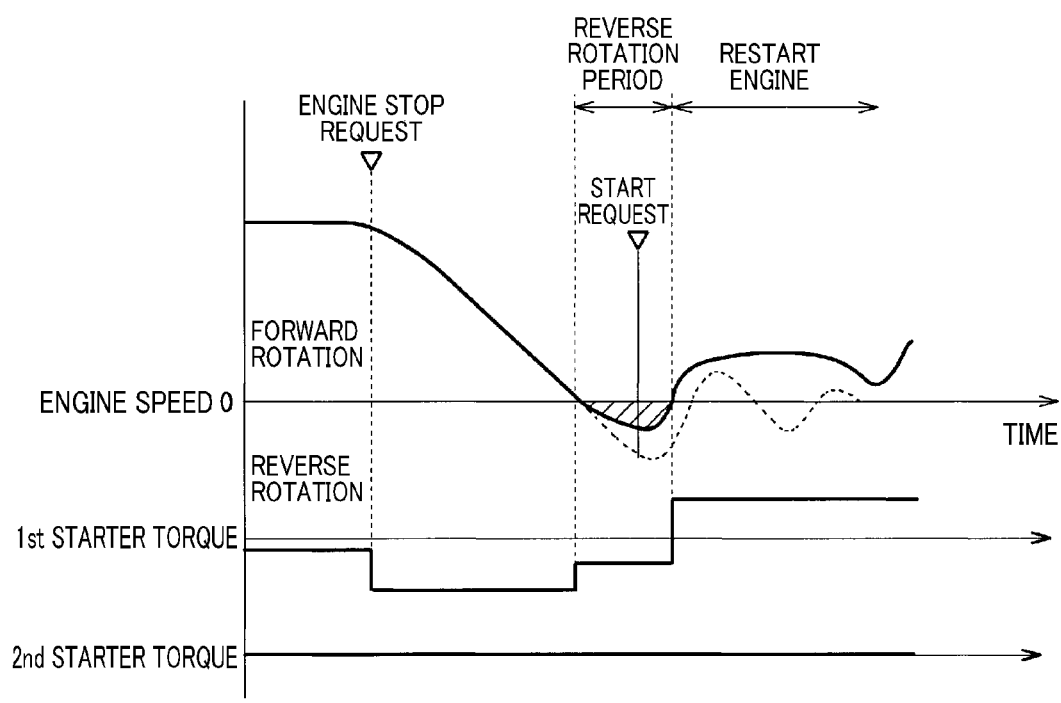
FIG. 10 shows a time chart according to the control of the third embodiment.
Figure 11:
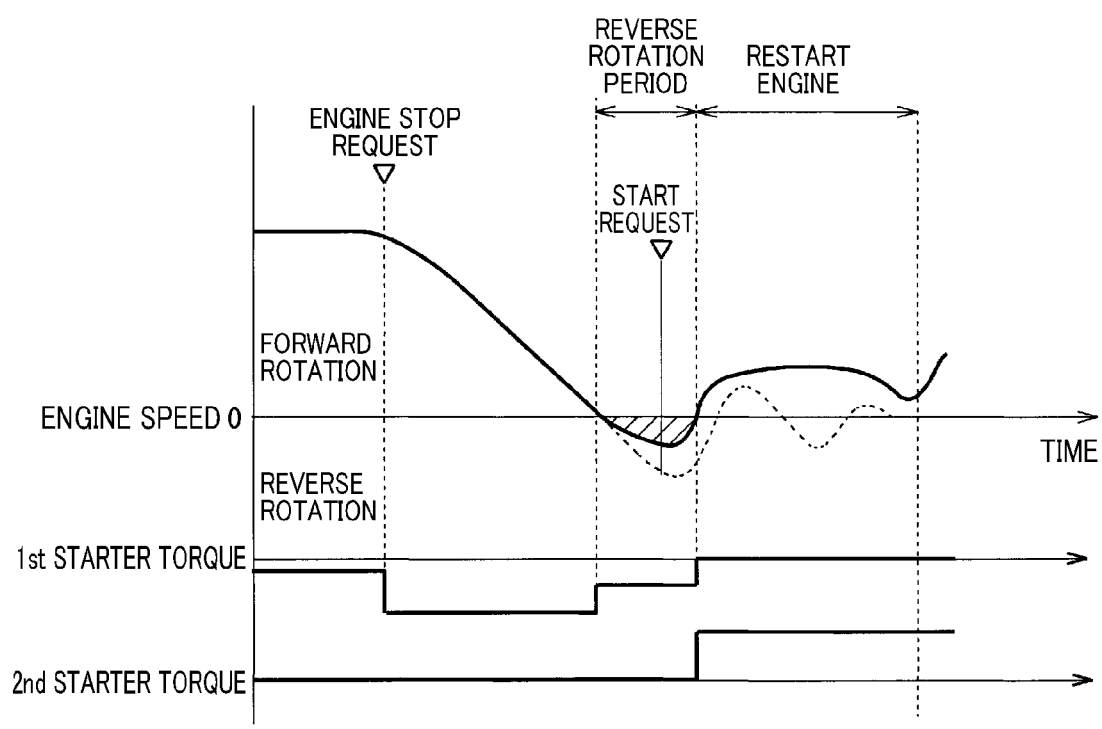
FIG. 11 shows another time chart according to the control of the third embodiment.
Figure 12:
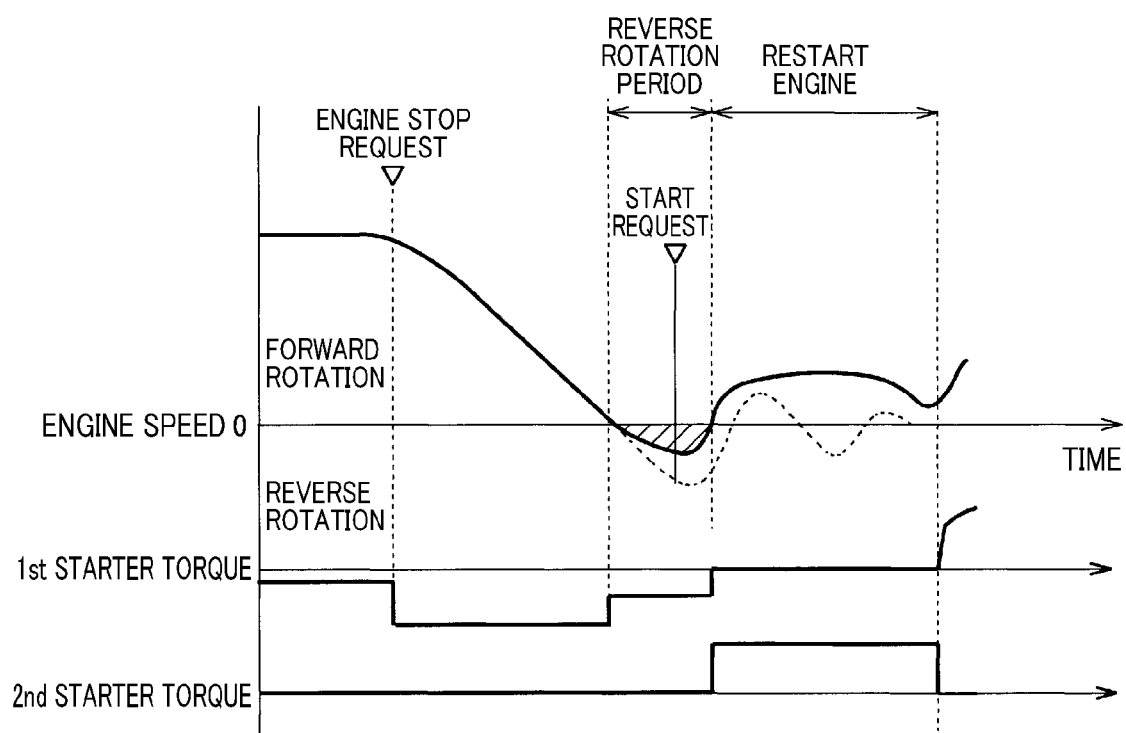
FIG. 12 shows yet another time chart according to the control of the third embodiment.

The number of revolutions in the reverse direction can be reduced, as shown in a solid line graph (engine speed) in FIGS. 10 to 12, by using the first starter 2 by executing step S21, reverse rotation of the crankshaft 1a can be suppressed from being caused when reverse rotation of the crankshaft 1a is detected.

As a result, since reverse rotation period is shortened, the delay from the generation of the start request to the start of cranking can be reduced as compared with a case where reverse rotation of the crankshaft 1a is not suppressed from being generated, so that the starting time of the engine 1 can be further shortened.

Note that FIGS. 10 to 12 are time charts showing a case where the cranking is performed only by the first starter 2 (FIG. 10), a case where the cranking is performed only by the second starter 3 (FIG. 11), and a case where the cranking is performed by using both the first starter 2 and the second starter 3 (FIG. 12).

Further, in FIGS. 10 to 12, the first starter 2 is driven by the engine 1 to function as a generator before the stop request of the engine 1 is generated, and the first starter 2 functions as a regenerative brake after the stop request is generated, thus the graphs indicate that the torque of the first starter 2 is changing.

Fourth Embodiment

In the fourth embodiment, a drive command to be outputted to the first starter 2 and a drive command to be outputted to the second starter 3 are configured separately.

Figure 13:
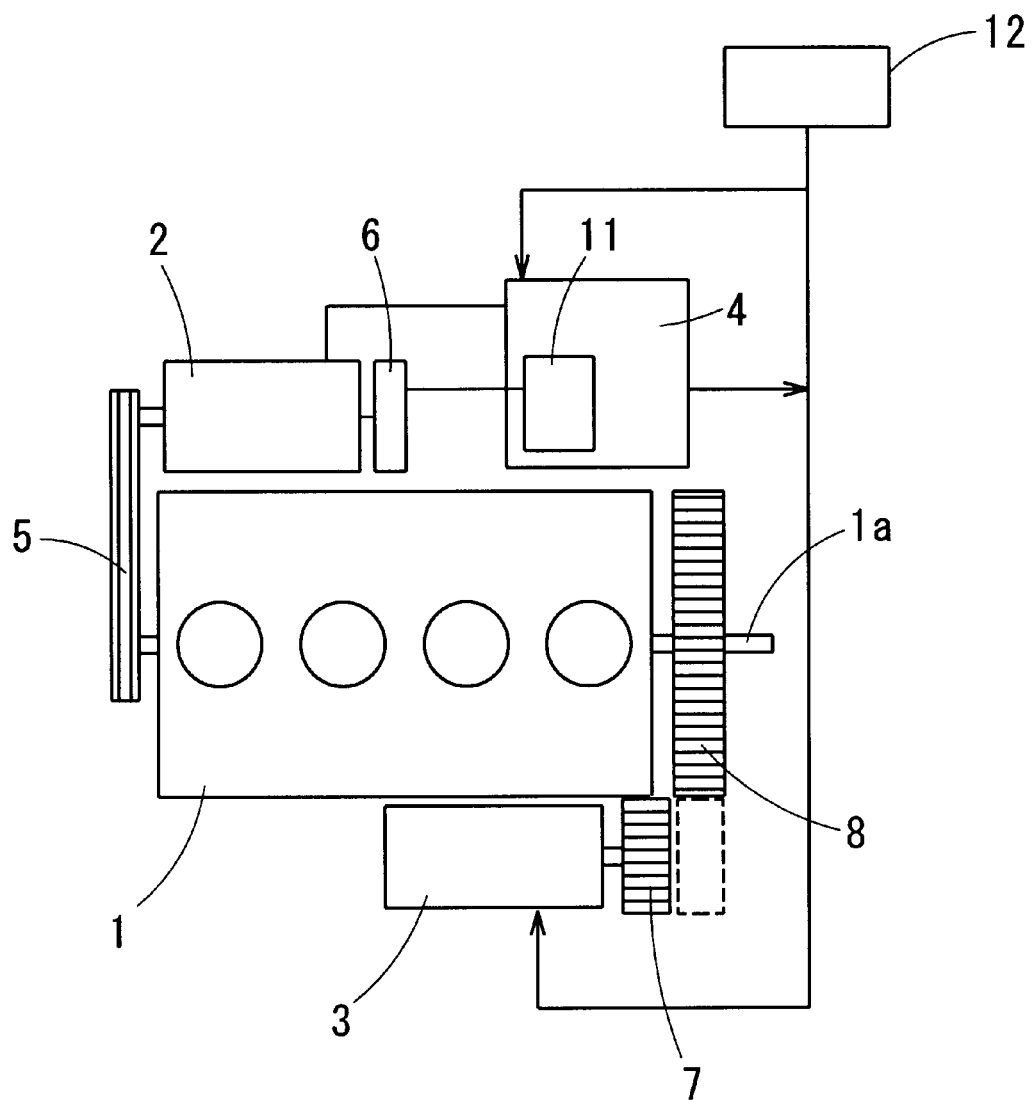
FIG. 13 shows a configuration diagram of an engine starting system according to a fourth embodiment.

The drive command to the second starter 3 is not necessarily required to be outputted from the control device 4, and, for example, as shown in FIG. 13, it may be outputted from the engine ECU 12 to the second starter 3 without going through the control device 4.

Fifth Embodiment

In the fifth embodiment, the rotation determination section 11 discriminates the rotation direction of the crankshaft 1a based on the physical quantity (for example, a current or a voltage flowing through the switching element 4a, the current sensor 10, or the like) managed by the control device 4 to control the operation of the first starter 2.

Figure 14:
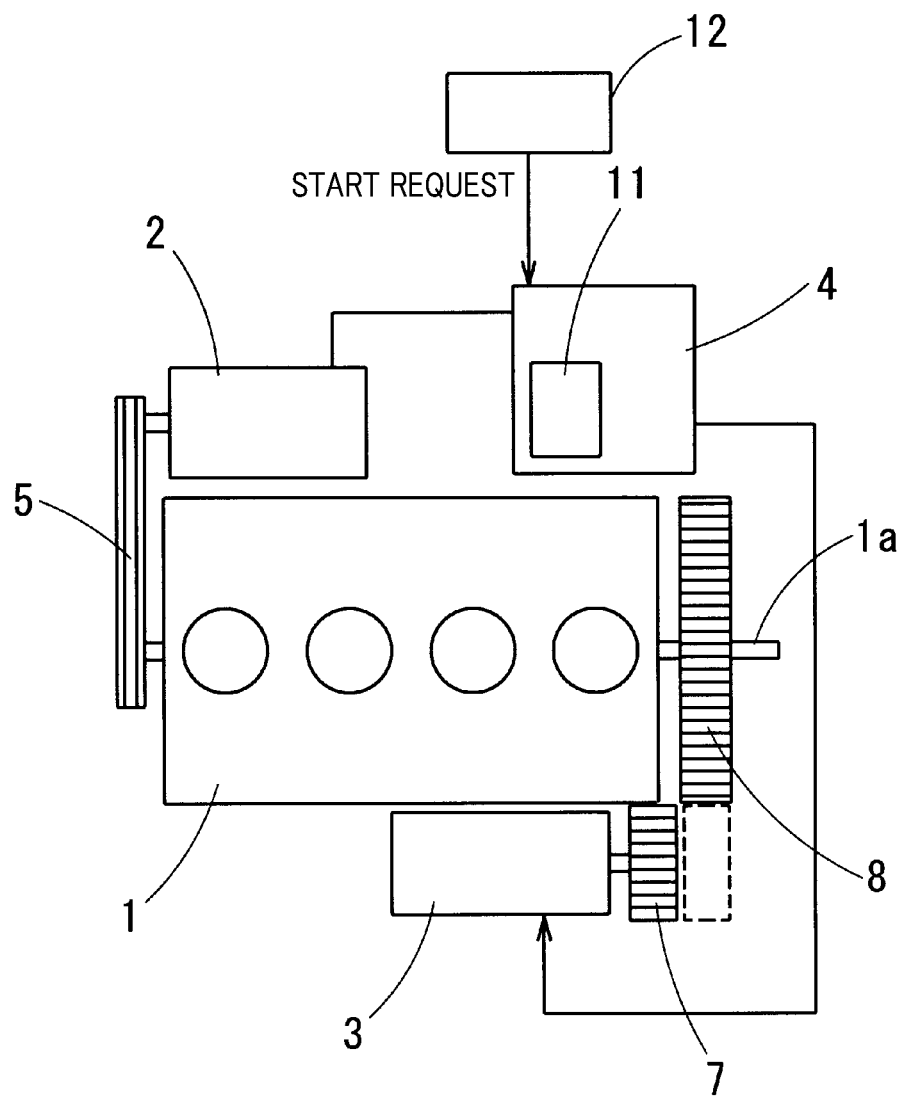
FIG. 14 shows a configuration diagram of an engine starting system according to a fifth embodiment.

In this case, since the first starter 2 does not have the rotation angle sensor 6, as shown in FIG. 14, that is, reverse rotation of the crankshaft 1a can be detected even without the rotation angle sensor 6, it is possible to reduce the cost.

Sixth Embodiment

In the sixth embodiment, the rotation determination section 11 is provided outside the control device 4.

Figure 15:
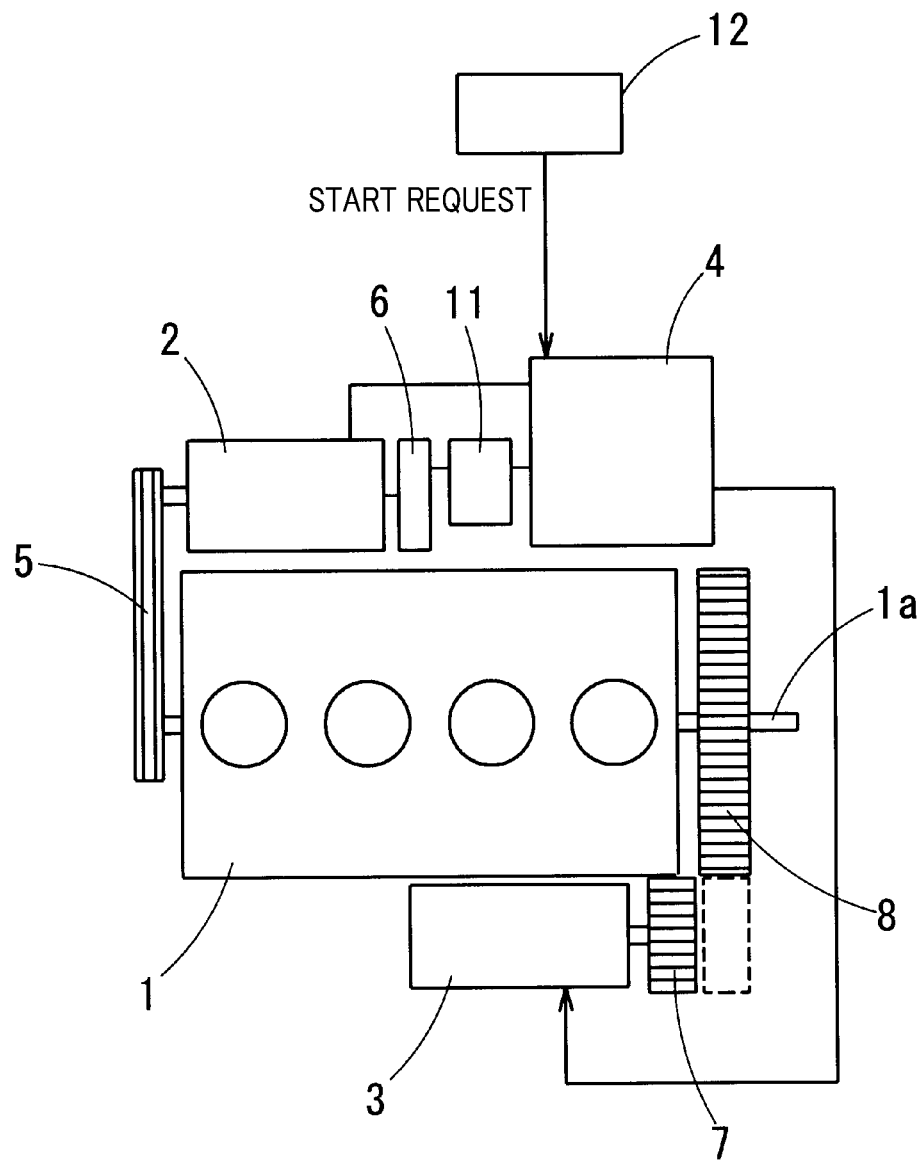
FIG. 15 shows a configuration diagram of an engine starting system according to a sixth embodiment.

The rotation determination section 11 is not necessarily provided as one function of the control device 4, but it may be provided outside the control device 4, and is configured to output the information from the rotation determination section 11 to the control device 4 as shown in FIG. 15, for example.

[Modifications]

Although the case where either one of the first starter 2 and the second starter 3 is selected based on the temperature has been described in the first embodiment, either one of the starting devices may be preferentially driven regardless of the temperature.

For example, the second starter 3 having a larger transmission torque than the first starter 2 can be preferentially used for the cranking.

Alternatively, it is also possible to make a fault judgment between the first starter 2 and the second starter 3, and if one of the starting devices is determined to be faulty, the cranking can be performed by the other one.

In the second embodiment and the third embodiment, switching from the second starter 3 to the first starter 2 after determining that the piston has gone over the compression top dead center.

However, in a case where it can be determined that the piston can go over before reaching the compression top dead center, it may be switched from the second starter 3 to the first starter 2 based on the determination.

That is, since the inertial energy is accumulated in the rotating system including the crankshaft 1a and the ring gear before switching from the second starter 3 to the first starter 2, there may be a case where the first starter 2 with small torque can go over the compression top dead center.

Therefore, in a case where it can be determined that the piston can go over based on the engine speed or the like before the piston goes over the compression top dead center, it can also be switched from the second starter 3 to the first starter 2 regardless of whether or not the piston goes over the compression top dead center.

What is claimed is:

1. An engine starting system comprising:
   a starting device for transmitting a rotational force thereof to a crankshaft of an engine to drive the crankshaft, the starting device including a first starter constantly connected to the crankshaft and a second starter connected to the crankshaft by a disengageable coupling; and
   a control device for controlling an operation of the starting device in response to a start request of the engine; wherein
   the engine starting system includes a rotation determination section capable of discriminating a rotation direction of the crankshaft;
   when a period where the crankshaft rotates in a reverse direction while the engine is stopping is referred to as a reverse rotation period;

the control device sets the reverse rotation period as a cranking prohibition period for prohibiting the starting device from driving the crankshaft;

if the start request is generated during the reverse rotation period, the starting device is operated to drive the crankshaft based on an information from the rotation determination section when it is detected that the crankshaft has shifted from reverse rotation to forward rotation by driving the crankshaft by either one of the first starter and the second starter, or both the first starter and the second starter;

the first starter is an alternator that varies a rotational speed according to a power source frequency; and the control device is an inverter that includes a switching element for varying a frequency to be applied to the alternator according to an on/off operation of the switching element, and a control circuit for controlling an on/off operation of the switching element while managing a drive timing of the second starter.

2. The engine starting system according to claim 1, wherein
the control device drives the starting device to drive the crankshaft when the control device detects that the crankshaft has shifted from a first reverse rotation to the forward rotation.

3. The engine starting system according to claim 1, wherein
by operating the first starter, the control device suppresses the reverse rotation of the crankshaft from being caused when the reverse rotation of the crankshaft is detected based on the information from the rotation determination section.

4. The engine starting system according to claim 1, wherein
the first starter has a rotation angle detection section capable of detecting a rotational position of the first starter; and
the rotation determination section discriminates the rotation direction of the crankshaft by inputting the rotational position of the first starter detected by the rotation angle detection section.

5. The engine starting system according to claim 1, wherein
the rotation determination section discriminates the rotation direction of the crankshaft based on a physical quantity managed by the control device to control an operation of the first starter.

6. The engine starting system according to claim 1, wherein
the control device:
operates the second starter prior to the first starter to drive the crankshaft when driving the crank shaft by using both the first starter and the second starter;
determines whether or not a piston of the engine can go over a top dead center in a first compression stroke based on at least one piece of information among a rotational speed, torque, and current of the first starter; and
after determining that the piston can go over the top dead center, switching from the second starter to the first starter to drive the crankshaft.

7. The engine starting system according to claim 1, wherein
the control device:
operates the second starter prior to the first starter to drive the crankshaft when driving the crank shaft by using both the first starter and the second starter;
determines whether or not a piston of the engine can go over a top dead center in a first compression stroke based on at least one piece of information among a rotational speed, torque, and current of the first starter; and
after determining that the piston has gone over the top dead center, switching from the second starter to the first starter to drive the crankshaft.

8. The engine starting system according to claim 6, wherein
a torque transmitted from the second starter to the crankshaft is larger than a torque transmitted from the first starter to the crankshaft.

9. The engine starting system according to claim 1, wherein
the disengageable coupling of the second starter includes a pinion that can mesh with a ring gear connected to the crankshaft, and a solenoid that generates an electromagnetic force in response to a drive command outputted from the control device; and
the pinion is pushed toward the ring gear by utilizing the electromagnetic force of the solenoid.

10. The engine starting system according to claim 1, wherein
the first starter is connected to the crankshaft via a belt.

11. An engine starting system comprising:
a starting device for transmitting a rotational force thereof to a crankshaft of an engine to drive the crankshaft, the starting device including a first starter constantly connected to the crankshaft and a second starter connected to the crankshaft by a disengageable coupling; and
a control device for controlling an operation of the starting device in response to a start request of the engine; wherein
the engine starting system includes a rotation determination section capable of discriminating a rotation direction of the crankshaft;
when a period where the crankshaft rotates in a reverse direction while the engine is stopping is referred to as a reverse rotation period;
the control device sets the reverse rotation period as a cranking prohibition period for prohibiting the starting device from driving the crankshaft;
if the start request is generated during the reverse rotation period, the starting device is operated to drive the crankshaft based on an information from the rotation determination section when it is detected that the crankshaft has shifted from reverse rotation to forward rotation by driving the crankshaft by either one of the first starter and the second starter, or both the first starter and the second starter; and
the control device:
operates the second starter prior to the first starter to drive the crankshaft when driving the crank shaft by using both the first starter and the second starter;
determines whether or not a piston of the engine can go over a top dead center in a first compression stroke based on at least one piece of information among a rotational speed, torque, and current of the first starter; and
after determining that the piston can go over the top dead center, switching from the second starter to the first starter to drive the crankshaft.

12. The engine starting system according to claim 11, wherein the control device drives the starting device to drive the crankshaft when the control device detects that the crankshaft has shifted from a first reverse rotation to the forward rotation.

13. The engine starting system according to claim 11, wherein
by operating the first starter, the control device suppresses the reverse rotation of the crankshaft from being caused when the reverse rotation of the crankshaft is detected based on the information from the rotation determination section.

14. The engine starting system according to claim 11, wherein
the first starter has a rotation angle detection section capable of detecting a rotational position of the first starter; and
the rotation determination section discriminates the rotation direction of the crankshaft by inputting the rotational position of the first starter detected by the rotation angle detection section.

15. The engine starting system according to claim 11, wherein
the rotation determination section discriminates the rotation direction of the crankshaft based on a physical quantity managed by the control device to control an operation of the first starter.

16. The engine starting system according to claim 11, wherein
a torque transmitted from the second starter to the crankshaft is larger than a torque transmitted from the first starter to the crankshaft.

17. The engine starting system according to claim 11, wherein
the disengageable coupling of the second starter includes a pinion that can mesh with a ring gear connected to the crankshaft, and a solenoid that generates an electromagnetic force in response to a drive command outputted from the control device; and
the pinion is pushed toward the ring gear by utilizing the electromagnetic force of the solenoid.

18. The engine starting system according to claim 11, wherein
the first starter is connected to the crankshaft via a belt.

19. An engine starting system comprising:
a starting device for transmitting a rotational force thereof to a crankshaft of an engine to drive the crankshaft, the starting device including a first starter constantly connected to the crankshaft and a second starter connected to the crankshaft by a disengageable coupling; and
a control device for controlling an operation of the starting device in response to a start request of the engine; wherein
the engine starting system includes a rotation determination section capable of discriminating a rotation direction of the crankshaft;
when a period where the crankshaft rotates in a reverse direction while the engine is stopping is referred to as a reverse rotation period;
the control device sets the reverse rotation period as a cranking prohibition period for prohibiting the starting device from driving the crankshaft;
if the start request is generated during the reverse rotation period, the starting device is operated to drive the crankshaft based on an information from the rotation determination section when it is detected that the crankshaft has shifted from reverse rotation to forward rotation by driving the crankshaft by either one of the first starter and the second starter, or both the first starter and the second starter; and
the control device:
operates the second starter prior to the first starter to drive the crankshaft when driving the crank shaft by using both the first starter and the second starter;
determines whether or not a piston of the engine can go over a top dead center in a first compression stroke based on at least one piece of information among a rotational speed, torque, and current of the first starter; and
after determining that the piston has gone over the top dead center, switching from the second starter to the first starter to drive the crankshaft.

20. The engine starting system according to claim 19, wherein
the control device drives the starting device to drive the crankshaft when the control device detects that the crankshaft has shifted from a first reverse rotation to the forward rotation.

21. The engine starting system according to claim 19, wherein
by operating the first starter, the control device suppresses the reverse rotation of the crankshaft from being caused when the reverse rotation of the crankshaft is detected based on the information from the rotation determination section.

22. The engine starting system according to claim 19, wherein
the first starter has a rotation angle detection section capable of detecting a rotational position of the first starter; and
the rotation determination section discriminates the rotation direction of the crankshaft by inputting the rotational position of the first starter detected by the rotation angle detection section.

23. The engine starting system according to claim 19, wherein
the rotation determination section discriminates the rotation direction of the crankshaft based on a physical quantity managed by the control device to control an operation of the first starter.

24. The engine starting system according to claim 19, wherein
a torque transmitted from the second starter to the crankshaft is larger than a torque transmitted from the first starter to the crankshaft.

25. The engine starting system according to claim 19, wherein
the disengageable coupling of the second starter includes a pinion that can mesh with a ring gear connected to the crankshaft, and a solenoid that generates an electromagnetic force in response to a drive command outputted from the control device; and
the pinion is pushed toward the ring gear by utilizing the electromagnetic force of the solenoid.

26. The engine starting system according to claim 19, wherein
the first starter is connected to the crankshaft via a belt.

* * * * *